Patented June 7, 1938

2,119,841

UNITED STATES PATENT OFFICE 2,119,841

TOTALIZER ENGAGEMENT CONTROL DEVICE

Ernst Breitling, Berlin-Tempelhof, Germany, assignor to The National Cash Register Company, Dayton, Ohio, a corporation of Maryland Application June 13, 1935, Serial No. 26,371
In Germany June 22, 1934

12 Claims. (Cl. 235—61)

The invention relates to totalizer engagement control device, especially provided with several rows of totalizers and, more particularly, to a totalizer engaging control device operated by a mode of operation lever, by means of which device the totalizers are brought into engagement with the amount differentials at the proper times in accordance with the mode of operation of the machine.

The main object of the invention is to minimize the number of elements of such totalizer engaging control device.

Another object is to adapt a single element in such a way that the proper timing is effected by its mere adjustment.

Another object of the invention is to adapt a single cam disk for controlling the totalizer engagement at the proper time for all the modes of operation.

Another object of the invention is to provide for the proper adjustment of the single cam disk for varying the timing of the engagement.

Another object of the invention consists in the means for connecting the mode of operation lever with the engaging control disk.

Further objects of the invention will be pointed out in the following detailed description with reference to the annexed drawings.

The accompanying drawings show two preferred embodiments of the invention.

Of said drawings:

Fig. 3 is a section along line A—B of Fig. 2, Figs. 4 to 6 show the positions of the actuating member for the engaging device according to the different modes of operation.

General description

In general terms the invention has for its object to effect different modes of operations (addition, total and subtotal taking) in cash registers, accounting and computing machines, wherein the totalizers have to be connected at different times with the amount differential devices. In known machines the totalizers have to be engaged with the actuating members of the differential devices for adding operations before the actuating members start to return into normal position. For total taking, however, the totalizers have to be engaged with the actuating members before the latter start out of zero position, and be disengaged before starting their return movement. For a subtotal taking operation, however, the totalizers have to be engaged with the actuating members before the same are moved out of zero position and disengaged therefrom after the actuating members have returned to their normal position.

In order to effect the engagement of the totalizers with the amount differential devices at such different times, it is known to connect the engaging disk, with which the selected totalizer or totalizers are coupled, with several actuating means. There are usually as many different actuating means as there are different modes of operations to be carried out.

It has heretofore been known to reduce the number of actuating means, i. e., for instance, of cam disks for three modes of operation to two, each of the two cam disks being provided with curved grooves of different depth, and by cooperation of the flat portions of grooves of the two cam disks the third mode of operation is determined (U. S. Patent 1,898,346 to H. C. Dieserud).

According to the present invention, the number of the actuating means necessary for the different modes of operation, is further reduced by the arrangement of a single controlling means for the various modes of operation and the provision of it with operative elements which when properly adjusted, will vary the timing of engagement of the selected totalizer.

Amount differentials

Each amount key bank 11 (Fig. 1) has allotted thereto an amount differential device of a structure similar to that shown and described in my copending patent application, Serial No. 758,069 filed December 18, 1934, Patent No. 2,116,779, issued May 10, 1938.

The shaft 12 oscillating during each machine operation first in clockwise direction and, then, back into its rest position, has secured thereto two arms 13 carrying a cross rod 14. The said shaft 12 has mounted thereon also a main setting member 15 having an arc-slot 16 for the rod 14 to be moved therein. To each main setting member 15 is attached a spring 17 tending to rock it clockwisely and to keep the one end edge 18 of the arc-slot 16 in contact with the cross rod 14.

The main setting member 15 is provided on the one side with a bent over projection 19 engaging, when the machine is in rest position, a zero stop pawl 20 pivoted on a stationary pin 21 of the key bank. Under the action of a spring 22, the zero stop pawl 20 bears against a pin 23 of a detent 26 guided on stationary studs 24 and 25 of the key bank. If a key 11 is depressed, its pin 27 enters the corresponding inclined slot 28 of the detent 26 and moves the latter upward against the action of its spring 29. The pin 23 partaking in this movement, rocks the zero stop wall 20, against the action of its spring 22, in clockwise direction out of the path of the bent over projection 19. The main setting member 15 is also provided with a toothed segment 35 and further teeth 35'.

Adjacent to each setting member 15 there is rotatably arranged a toothed auxiliary setting member 30 the toothed segment of which is of a radius equalling the one 35 of the main setting member 15, in mesh with a gear 32. By means of a tube 33 slipped on over a shaft 31, each gear 32 is connected with a type wheel 34. Each auxiliary setting member 30 has on its left hand end a nose 45 bearing on the cross rod 14.

On a cross rod 37 in each denominational order a coupling pinion 36 is rotatably mounted to be brought into mesh simultaneously with the two toothed segments of the setting members. The cross rod 37 is carried by two arms 38 rotatably mounted on a shaft 41 (only one arm is shown). Each of the two arms 38 has an extension 40 provided with a roller 39 guided in a curved groove 42 of cam disks 44 secured to a shaft 43.

The differential device operates as follows:
Assumed, an amount key 11 has been depressed and, thereby, the zero stop pawl 20 moved out of the path of the bent over portion 19 of the main setting member 15. During the following machine operation the shaft 12 with the arms 13 and the cross rod 14 is rocked first in clockwise direction. In so doing, the springs 17 cause the main setting members 15 to follow the said shaft till the bent over portions 19 of the said members meet the feet of the depressed amount keys 11 which prevent thereby the continued movement of the main setting member 15. At the same time, the cross rod 14 rocking clockwisely, carries along by means of the noses 45 the auxiliary setting members 30 and resets, by the parts 32 and 33, the type wheels 34 to zero position. When the auxiliary setting members are in their zero positions, that is, when the cross rod 14 has stopped its rotation in clockwise direction, the cam disks 44 are rendered effective and engage the coupling pinions 36 with the toothed segments 35 of the main setting members 15 set according to the depressed keys 11, and with the toothed segments of the auxiliary setting members 30. Then, the cross rod 14 returns in counter-clockwise direction. When the said rod meets the end edges 18 of the arc-slots 16 of the setting members 15, it carries them along to zero position. Due to the main setting members 15 and the auxiliary setting members 30 being coupled together, the latter are displaced from zero position by a number of steps commensurate with the depressed keys 11. As a consequence thereof, the type wheels 34 are set to the amount corresponding to the value of the keys 11 depressed. When the setting members 15 have regained their rest positions, the coupling pinions 36 are disengaged again by the cam disks 44.

*Totalizers*

The adding wheels 50 of each of the four totalizers which are of well known art and thus not described in detail, are rotatably mounted on a shaft 51 supported by a frame formed by two arms 53 secured to a shaft 52. By means of spring depressed pawls 54 the adding wheels 50 are yieldingly held in their respective positions. Each adding wheel 50 has, further, allotted thereto a special tens transfer tooth 55.

Figure 1:
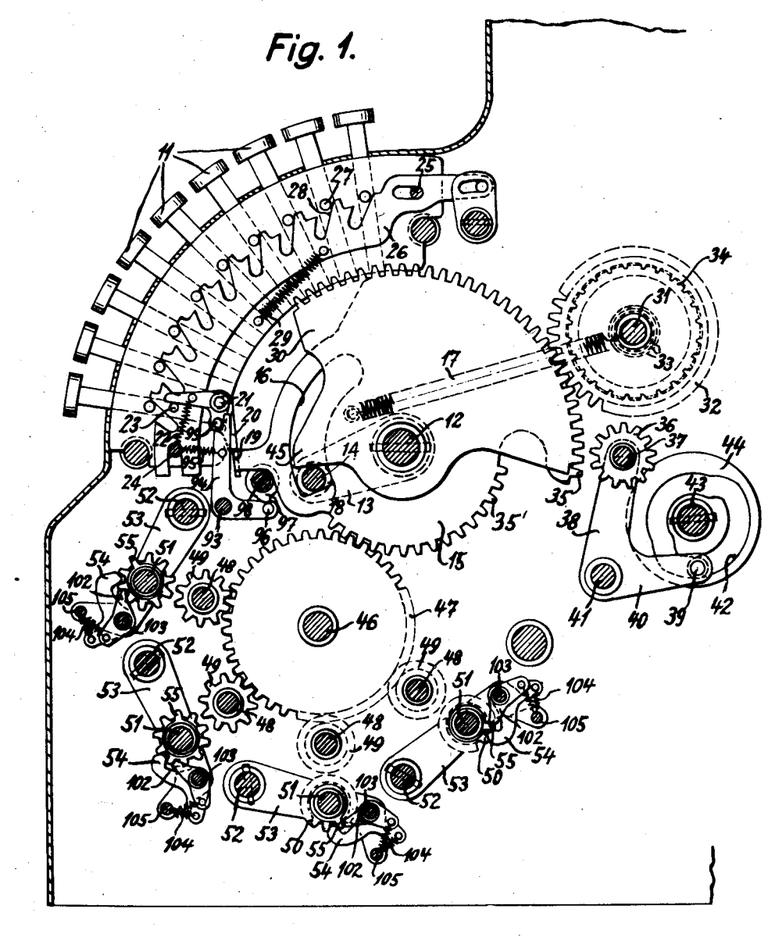
Fig. 1 is a cross section of the machine along an amount key bank in side view.

The toothed segment 35' of each main setting member 15 meshes with a gear 47 rotatably mounted on shaft 46. Each gear 47 engages four intermediate wheels 49 rotatably mounted on shafts 48, and enabled to be engaged by the adding wheels 50 of four totalizers as shown in Fig. 1.

*Totalizer selection*

Figure 2:
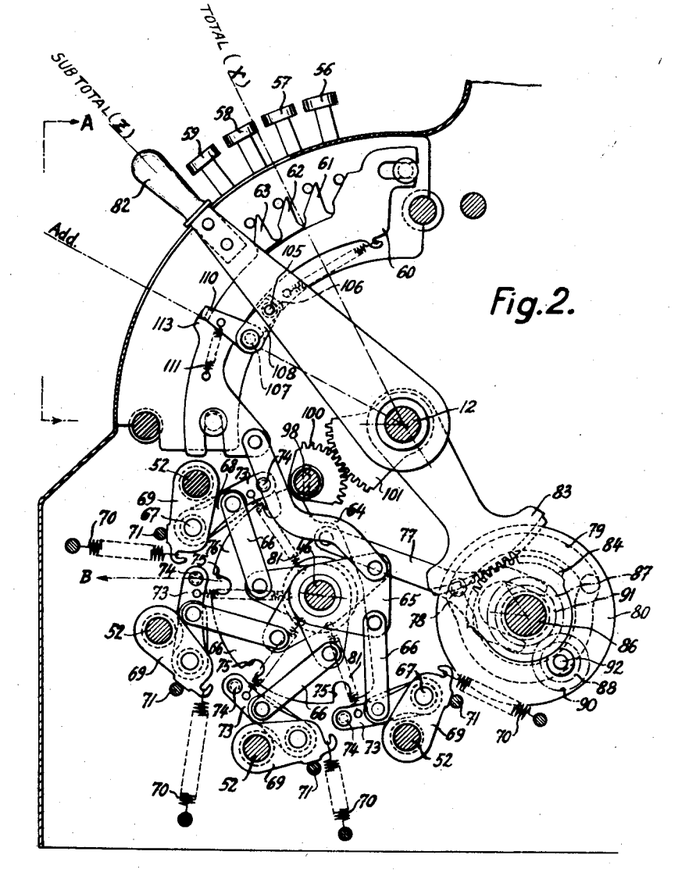
Fig. 2 is a side view of the totalizer selecting and engaging device and its actuating member.
Figure 3:
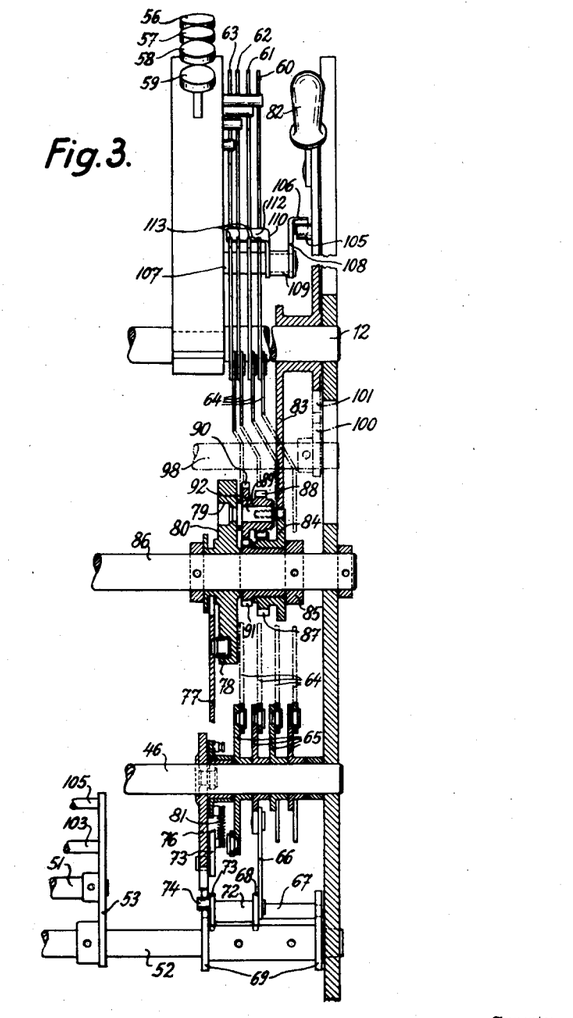

The four totalizers provided in the machine, are adapted to be selected by means of totalizer selecting keys 56 to 59 (Fig. 2). Four detents 60-63 are arranged in the special key bank, which in their shapes are essentially the same and which are provided each with a slope opposite the respective key 56 to 59. Each of the keys 56 to 59 can displace one of the detents 60 to 63. Each of the four detents 60 to 63 is connected by means of a link 64, to one of four levers 65 rockably arranged on a shaft 46 (see also Fig. 3). Each of these levers 65, is connected by means of a link 66, with an arm 68 arranged on a stub shaft 67. The shaft 67 is supported by two arms 69 each, fastened upon one of the four shafts 52. A spring 70 is tending to keep the arm 69 in contact with a stationary pin 71. The two frame arms 53 supporting each of the four totalizer shafts 51 are mounted upon every shaft 52, as already mentioned.

Each arm 68 is connected by a sleeve 72 with an arm 73, the pin 74 of which can enter a recess 75 of an engaging disk 76. The totalizer engaging disk 76 is rockably arranged on the shaft 46 and is connected to a pitman bifurcated to straddle a shaft 86. The roller 78 of the pitman 77 is guided in the cam groove 79 of a cam disk 80.

When one of the totalizer selecting keys 56 to 59 is depressed, the coupling pin 74 of the totalizer corresponding to the depressed key, is forced by means of the specified linkage into the proper recess 75 of the engaging disk 76. The engagement is secured by means of a spring 81 acting upon the arm 73.

*Totalizer engaging device*

In order to engage the totalizer with the amount differential device, the disk 76 is clockwisely rocked by means of the cam disk 80. Thereby the shaft 52 coupled with the disk 76 is rocked together with the supporting arms 53 of the totalizer shaft 51. The cam disk 80 drives the engaging disk 76 for all modes of operation, i. e., for adding, total and subtotal taking. To that effect, it has to be set accordingly before starting a machine operation when the mode of operation is varied. This is done by means of a mode of operation lever 82.

The mode of operation lever 82 is rockably mounted upon the shaft 12, and can be set to one of the three positions "Add", "Subtotal" and "Total". A toothed segment 83 connected with the mode of operation lever 82 engages a toothed segment 84, rotatably arranged on a sleeve 85 (Fig. 3) fastened to shaft 86. A gear 87 connected with the toothed segment 84 engages teeth 88 of a double toothed gear 89, the second toothing 90 of which meshes with a gear 91. The gear 91 is connected with the sleeve 85 secured onto the drive shaft 86. The double toothed gear 89 is rotatably arranged on a stud 92 of the cam disk 80 rotatable on the shaft 86.

The curved groove 79 of the disk 80, in which the roller 78 of the pitman 77 is guided, is shaped in such a way that, in each machine operation, a reciprocating movement is imparted to the pitman 77 and thereby to the engaging disk 76, whereby each time a totalizer coupled with the engaging disk 76 is brought in engagement with the amount differential device.

In order to enable the movements of the engaging disk 76 at the times corresponding to the different modes of operation, the cam disk 80, at every change of the mode of operation is set in advance by means of the mode of operation lever 82, so that the effective points of the curved groove 79 are adjusted to a different distance from the roller 78.

After a totalizer has been selected by depressing one of the totalizer selecting keys, and the coupling pin 74 corresponding to it has been brought into the opposite recess 75 of the disk 76, the shaft 86, during the machine operation, is going through a full cycle of counter-clockwise rotation, which by means of the gear 91 is transmitted in the form of clockwise rotation to the double-toothed gear 89. As the mode of operation lever 82 remains inoperative during the machine operation, the double-toothed gear 89 rolls on the gear 87, whereby the cam disk 80 receives a clockwise rotation.

*Disengaging the zero stop pawls during total taking actions*

Since in connection with a total taking action, regardless whether a subtotal or a total is taken, no amount key is depressed, the zero stop pawls 20 have to be brought into ineffective position in another manner. For this purpose, a stationary cross rod 93 (Fig. 1) has rotatably mounted thereon bell crank levers 94, each one thereof having a pin 96 bearing under the action of a spring 95 against a control disk 97 secured to a shaft 98. When the members are positioned as shown in Fig. 1 which position corresponds to the setting of the mode of operation lever 82 to "Add", a cam of the control disk 97 is above the pin 96. The nearly vertical arm of the bell crank lever 94 has a shouldered end engaging a pin 99 of the zero stop pawl 20.

The shaft 98 has secured thereto a segment gear 100 (Fig. 2) in mesh with a segment gear 101 connected to the mode of operation lever 82. When the mode of operation lever 82 is moved clockwise and thereby removed from the add position, the segment gear 100 together with the shaft 98 and the control disks 97, is rotated counter-clockwise by the segment gear 101. Thereby the cams of the control disks 97 are moved out of the path of the pins 96 so that the springs 95 become effective. As the springs 95 are stronger than springs 22 for the zero stop pawls 20, the bell crank levers 94 move, by means of the pins 99, the zero stop pawls 20 out of the path of the projections 19 of the main setting members 15.

*Subtotal taking*

The only operative portion of the cam groove 79 of the cam disk 80 is shaped so as to meet the conditions in connection with a subtotal taking action, being the action of longest duration of engagement. Therefore, this action will be described first:—

To take a subtotal, the mode of operation lever 82 has to be moved into the position shown in Fig. 2. Thereby, over the beforementioned gearing 83 to 91, the cam disk 80 is so adjusted (Figs. 2 and 5) that the roller 78 remains within the portion 79a of greater diameter of the cam groove 79 while the cam portion 79b leading to the cam portion 79c of minor diameter, lies directly beneath the roller 78. If, now, after the machine operation is initiated, the cam disk 80 is clockwisely rotated as mentioned, the pitman 77 is moved to the right by means of the cam portion 79b acting on the roller 78, immediately after the beginning of the machine operation, and the engaging disk 76 is rocked in clockwise direction. Thereby the disk 76, by means of the pin 74 engaging one of the recesses 75, carries along the respective arm 73, and rocks in counter-clockwise direction one of the shafts 52 to engage the adding wheels 50 of the respective totalizer with the intermediate wheels 49. Thereupon the cross rods 14 and the setting members 15 start their clockwise movement, and, over the gears 47 and the intermediate wheels 49, rotate the adding wheels 50 in counter-clockwise rotation till the tens carrying teeth 55 connected therewith, meet the front edges of pawls 102 thus being prevented to continue their movement.

The pawls 102 are rotatably mounted on a cross rod 103 supported by arms 53, and urged by springs 104 secured to a rod 105 carried by said arms 53 to remain in the path of the tens carrying teeth 55. When an adding wheel 50 is clockwisely rotated, the pawl 102 is able to pass the tens carrying tooth 55. If, however, during a counter-clockwise rotation of an adding wheel 50, a tens carrying tooth 55 has been arrested by a pawl 102, also the respective intermediate wheel 49, the gear 47 and the main setting member 15 are prevented from being moved further. The setting member 15 is, thereby, prevented from following the cross rod 14 completing its clockwise rocking movement and restoring the auxiliary setting member 30 to zero position. Thereby, however, the member 15 is set in accordance with the value represented by the respective adding wheel 50 set.

Before the cross rod 14 starts its counter-clockwise movement into rest position, as already mentioned, the coupling pinions 36 are engaged. Thereupon, by means of the cross rods, the main setting members 15 are restored and, at the same time, the auxiliary members 30 are moved out of their zero positions by a number of steps corresponding to the adjustment of the main setting members 15. Due to this, the type wheels 34 are set to the amount formerly standing on the engaged totalizer. While the main setting members 15 are restored to zero position, the adding wheels 50 of the engaged totalizer are held in engagement with the intermediate wheels 49 by means of the portion 79c of the cam disk 80. Thus, they are, again, clockwisely rotated to the same extent, they have been rotated in counter-clockwise direction during the first part of the machine operation. Thereby, however, the amount taken off the adding wheels 50, is retransferred to them.

After all the members 15 are restored to the rest position, the cam portion 79d of the cam groove 79 becomes effective, moves, over the roller 78, the pitman 77 to the left and rotates the engaging disk 76 in counter-clockwise direction. Thereby the totalizer is disengaged from the intermediate wheels 49, and by means of the portion 79a of the groove, held in disengaged position during the remainder of the machine operation.

Adding action

Figure 4:
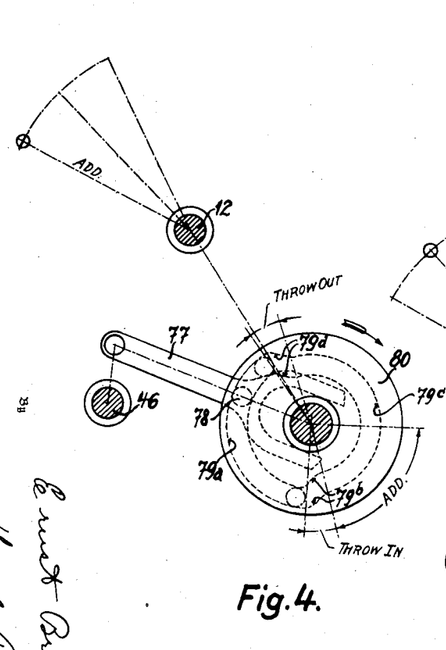

For an adding action the cam disk 80 is adjusted by the means 83 to 92 so that its cam groove 79 becomes positioned opposite the roller 78 as shown in Fig. 4. In this case the portion 79d of the cam groove 79 is near the roller 78 so that when the cam disk 80 rotates clockwisely, the totalizer coupled with the engaging disk 76 is, initially, held out of mesh with the intermediate gears 49 during a greater part of the machine operation. Only after, in the beforementioned manner, the main setting members 15 have been advanced to the feet of the depressed keys 11, and the coupling pinions 36 brought into effective position, the cam portion 79b becomes effective which portion brings the adding wheels 50 and the intermediate wheels 49 into engagement. While the differential members 15 are restored, the engaged adding wheels 50 are clockwisely advanced by a number of units corresponding to the value represented by the depressed keys. At the end of the machine operation, the cam portion 79d becomes effective and moves the roller 78 back into the cam groove portion 79a, whereby the adding wheels 50 are disengaged again.

Total taking

Figures 5, 6:
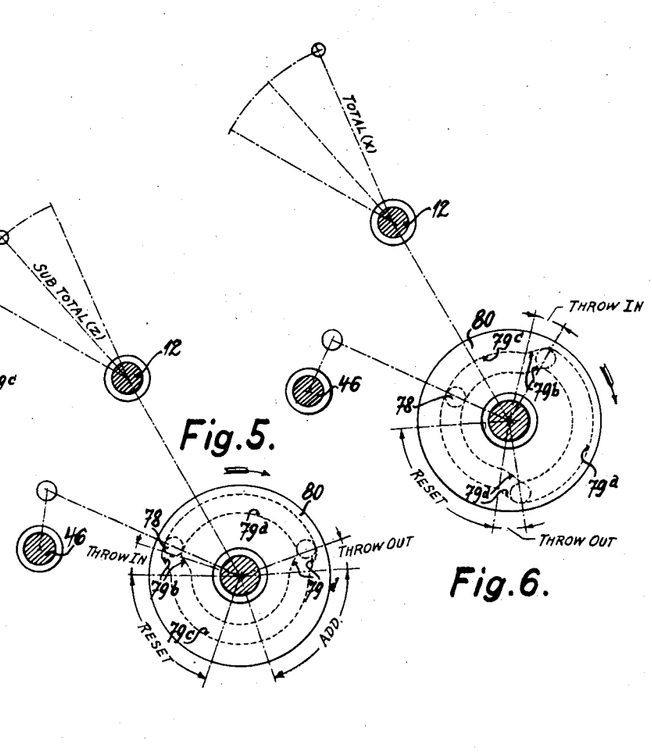

For a total taking action the cam disk 80 is adjusted so that its cam groove 79 is positioned opposite the roller 78 as shown in Fig. 6. In this case, with the machine in rest position, the roller 78 is moved into the cam groove portion 79c only by means of displacing the mode of operation lever 82. Thereby the pitman 77 is moved to the right, the engaging disk 76 is rocked in clockwise direction and the selected totalizer is engaged with the intermediate gears 49 already before the machine operation is started.

This requires that the totalizer to be reset is selected before displacing the mode of operation lever by means of depressing one of the keys 56 to 59. A particular locking means (see Fig. 2) prevents, therefore, the mode of operation lever 82 from being set to total taking position, before one of the keys 56 to 59 has been depressed. The bent over portion 106 of an arm 108 rotatably arranged on a stationary pin 107 embraces from behind a pin 105 of the mode of operation lever 82, which arm 108 is connected with a second arm 110 by means of a sleeve 109. A bent over portion of the arm 110 is moved under the action of a spring 111 into the path of projections 113 of the detents 60 to 63. When one of the keys 56 to 59 is depressed and thereby one of the detents 60 to 63 is moved upwardly, its projection 113 rocks the arm 110 clockwise and the arm 108 connected therewith, and removes thereby the bent over portion 106 out of the path of the pin 105. Only now the mode of operation lever 82 can be set to total taking position.

Thus, when a totalizer coupled with the engaging disk 76, is in mesh with the intermediate gears 49, upon adjusting the mode of operation lever 82 to the total taking position, and, when now a machine operation is initiated, first the same actions take place as described in connection with the first part of a subtotal taking action. That is, the adding wheels 50 are rotated counterclockwise till their tens carrying teeth 55 are arrested by the pawls 102. When the cross rod 14 has restored the auxiliary setting members 30 to their zero positions, the adding wheels 50 are disengaged from the intermediate wheels 49 by the cam groove portion 79d of the cam disk 80. While the differential members 15 are restored to zero position, only the type wheels 34 are set in accordance with the amount set up previously on the adding wheels 50, the adding wheels 50 remaining at zero.

After the main setting members 15 are completely restored, the portion 79b of the cam groove again brings the adding wheels of the selected totalizer and the intermediate wheels 49 into engagement. This engaging movement, however, does not affect the state of the totalizer as the amount differentials have already completed their operations.

Thus it becomes evident that at the end of the machine operation, at the same point as at the beginning of the machine operation, the totalizer set to zero is engaged again with the amount differential devices. When, therefore, in a subsequent machine operation, a second totalizer is to be reset, the mode of operation lever must be restored to subtotal taking position, so that the totalizer already reset can be disengaged, and a new one can be engaged. Suitably, this restoring from total taking to subtotal taking position can be carried out automatically in any known manner, i. e., the mode of operation lever will be reset near the end of the machine operation, before the depressed totalizer selecting key is released, so that also the locking arm 108 can regain its operative position.

Modification of the cam disk

Figures 7, 8, 9:
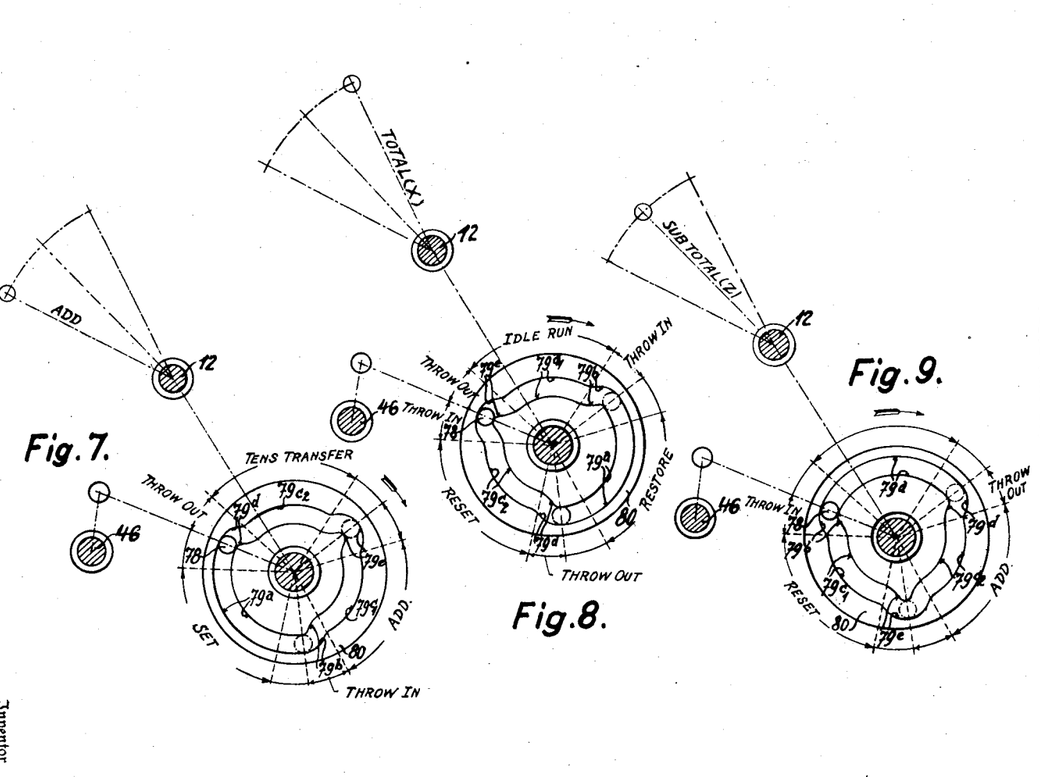
Figs. 7 to 9 illustrate in top view a modification of the actuating member in its adjustment for adding, total and subtotal taking.

The additional mechanisms, including the interlock 105—106 and the means for automatically restoring the mode of operation lever to sub-total position, needed when a cam disk formed as just described, is used, can be dispensed with when the cam groove 79 is shaped as shown in Figs. 7 to 9. The modification differs materially from the disk set forth primarily, in that the cam groove portion 79c of minor radius is divided into two portions $79c^1$ and $79c^2$ by means of a cam portion 79e. The said cam portion 79e disengages, i. e., during a subtotal taking action (Fig. 9) temporarily the adding wheels 50 after they have been restored, and engages them again with the intermediate wheels 49 before the cross rod 14 starts its counter-clockwise rocking. This movement is merely an idle one and does not affect the further course of the actions. During an adding operation (Fig. 7) the cam portion 79e disengages temporarily the adding wheels 50, after the main setting members 15 are again in normal positions. Also in this mode of operation the movement caused by the cam 79e does not affect the further actions. During a total taking action (Fig. 8) the cam portion 79e, however, with the machine in rest position, acts upon the roller 78. Thus, it holds the adding wheels 50, with the machine in rest position, out of engagement with the intermediate wheels 49. Therefore, it is of no importance whether the totalizer to be reset, is first selected by means of one of the keys 56 to 59, and then the mode of operation lever 82 is set to total taking, or vice versa. Further, it is not necessary that the mode of operation lever 82 after the totalizer is reset, has to be restored temporarily into the subtotal taking position. Further, during a total taking action, the individual actions are not affected by the special movement caused by the cam 79e.

While the form of mechanism herein shown and described, is admirably adapted to fulfill the objects primarily stated, it is to be understood that it is not intended to confine the invention to the embodiments herein disclosed, for it is susceptible of embodiment in various other forms all coming within the scope of the claims which follow.

What is claimed as new is:

1. In a machine of the class described, the combination of a totalizer, actuators therefor, a cam having a single cam groove, means to operate the cam during a machine operation, totalizer engaging means actuated by the cam groove to engage the totalizer with the actuators and disengage the totalizer from the actuators, and means to adjust said cam prior to a machine operation, whereby the timing of engagement and disengagement of the totalizer is varied for different operations of the machine.

2. In a machine of the class described capable of adding, subtotal taking, and reset total taking operations, the combination of a totalizer, actuators therefor, a drive shaft, a cam on the drive shaft, totalizer engaging means operated by the cam to engage and disengage the totalizer with and from the actuators, and means to rotate the cam on the drive shaft prior to a machine operation to selectively cause the time of engagement and disengagement of the totalizer to vary for each of said operations.

3. In a machine of the class described, the combination of a totalizer, actuators therefor, a rotatably mounted cam, means actuated by the cam to engage and disengage the totalizer with and from the actuators, a manipulative device to condition the machine for add, sub-total, and reset operations, a planetary gear connection between the manipulative device and the cam whereby the cam is rotated a different extent, by the manipulative device when the manipulative device is set to condition the machine, for each of said operations prior to the machine operation, and means operating through said planetary gear connection to rotate the cam a complete revolution during every machine operation.

4. In a machine of the class described, the combination of a totalizer, actuators therefor, a rotatably mounted cam, totalizer engaging means operated by said cam to engage and disengage the totalizer with and from the actuators, a manipulative device to condition the machine for add, sub-total, and reset operations, a planetary gear connection between the manipulative device and the cam whereby the cam is rotated different extents by the manipulative device when the manipulative device is set to condition the machine for said operations prior to the machine operation, and means operable through said planetary gear connection to rotate the cam one complete revolution during the machine operation from the position to which the cam is rotated by the manipulative device.

5. In a machine of the class described, the combination of a totalizer, actuators therefor, a single cam having a single cam groove to engage and disengage the totalizer with and from the actuators, a manipulative device, connections operated by the manipulative device to adjust the cam before a machine operation, and means including certain elements of said connections to rotate the cam a complete cycle during the machine operation from the position to which it was adjusted by the manipulative device to control the engagement and disengagement of the totalizer according to the position of the manipulative device.

6. In a machine of the class described, the combination of a totalizer, actuators therefor, driving mechanism for the machine, a manipulative device, connections operated by the manipulative device, and totalizer engaging mechanism including an element adjustable to a plurality of initial positions by said connections and thereafter operable by the driving mechanism during an operation of the machine, said element when moved to one of said initial positions causing the totalizer to directly engage with the actuators and when moved to another of its initial positions causing the totalizer to be engaged during the machine operation.

7. In a machine of the class described, the combination of a drive shaft, a cam on the drive shaft, a manipulative device, planetary gear connections between the manipulative device and the cam whereby the cam may be rotated by the manipulative device prior to a machine operation to change the effective timing of the cam during a machine operation, and means operable through the planetary gear connection to rotate the cam one complete rotation, from the position in which it is set by the manipulative device, during the machine operation.

8. In a machine of the class described capable of performing adding, subtotal taking, and reset total taking operations, the combination of differential actuators; a totalizer; means to engage the totalizer with the actuators; a single cam adapted to operate the totalizer engaging means in adding, subtotal taking, and reset total taking timing; means to rotate the cam during a machine operation; and a manipulative means operatively connected with the last named means while the machine is at rest for rotatably adjusting the cam on its axis prior to a machine operation, whereby the totalizer engaging means may be selectively operated in any one of said timings during a machine operation.

9. In a machine of the class described capable of performing adding, subtotal taking, and reset total taking operations, the combination of differential actuators; a totalizer; means to engage the totalizer with the actuators; a single adjustable cam having a single cam groove for operating the totalizer engaging means in adding, subtotal taking, and reset total taking timing; means to give the cam a complete revolution during each of said operations; and a manipulative device connected to the last named means for rotatably adjusting the cam on its axis prior to a machine operation, to cause the cam to operate the engaging means in any of said timings during an operation of the machine.

10. In a machine of the class described capable of performing adding, subtotal taking, and reset total taking operations, the combination of differential actuators; a totalizer; means to engage the totalizer with the actuators; a single adjustable cam having a single cam groove; means to rotate the cam a complete revolution during each machine operation to actuate the engaging means in adding, subtotal taking, or reset total taking timing; and a manipulative means operably connected with the rotating means for adjusting the cam on its axis previously to a machine operation to control the time of operation of the totalizer engaging means during said revolution.

11. In a machine of the class described capable of performing adding, subtotal taking, and reset total taking operations, the combination of differential actuators; a totalizer; a totalizer engaging means to engage the totalizer with the actuators; a single adjustable cam member; a single cam groove in the cam member for operating the engaging means in adding, subtotal taking, and reset total taking timings; means to rotate the cam a complete revolution during every machine operation; and a manipulative device connected to the means to rotate the cam to adjust the cam on its axis before a machine operation to selectively control the effective timing of the cam.

12. A totalizer engagement control device for cash registers, accounting and the like machines consisting of a single adjustable cam disk provided with a single cam race for causing the engagement of totalizers in adding, subtotal taking, and reset total taking operations; means operated by the cam disk to engage the totalizers; a manipulative device; and connections operated by the manipulative device to adjust the cam disk for any one of the said operations.

ERNST BREITLING.